Figure 1:
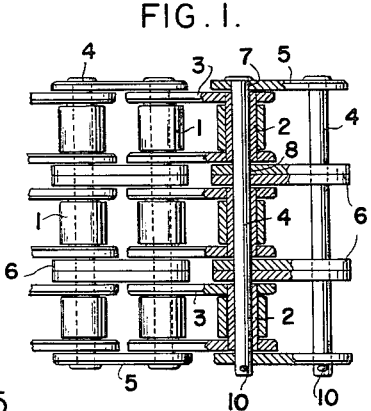

June 11, 1963 A. F. LARKIN, JR 3,092,957
METHOD OF PROVIDING CONTROLLED INTERFERENCE FIT
OF A CHAIN PIN IN A PIN PLATE
Filed Sept. 17, 1959

*INVENTOR.*
ALFRED F. LARKIN JR.
BY
*Ernst W. Schultz*
*ATTORNEY*

United States Patent Office 3,092,957
Patented June 11, 1963

3,092,957
METHOD OF PROVIDING CONTROLLED INTERFERENCE FIT OF A CHAIN PIN IN A PIN PLATE
Alfred F. Larkin, Jr., Grafton, Mass., assignor to Chain Belt Company, Milwaukee, Wis., a corporation of Wisconsin
Filed Sept. 17, 1959, Ser. No. 840,726
5 Claims. (Cl. 59—8)

This invention relates to multiple-strand roller-chain and particularly to the construction of the spacer or center plates of such chain. The invention also provides an improved method of forming the hole of the spacer plate to provide the particular interference fit of the pin in the plate as disclosed and claimed in Patent No. 2,869,379, granted January 20, 1959, to Brinton Welser.

According to Patent No. 2,869,379, the holes for the pin are of an ovoid shape and the pins and spacer plates are assembled with interferences occurring principally along the flatter parts of the ovoid. According to the invention therein, the interferences uniquely provide an improved securement of the pin against the load bearing area of the plate which provides ease of assembly and disassembly of the pin and plate and which nonetheless remains firm in chain service so that the pin is not subject to loosening with consequent fretting of the pin and plate.

The improved securement of the pin is intended for used between the pins and the center or spacer plates of a multiple strand chain wherein such plates are assembled in pairs or double rows. Variations in the pitch or distance between holes of such plates causes pins to be too tight in some of the plates, and if the hole size is increased to accommodate such variation in pitch, the pins are too loose in holes where the variation does not occur.

An object of the present invention is to provide improved control of the hole size of the spacer plate and of the degree of interference between the pin and the plate.

Another object of the invention is to allow first forming a round hole and then the desired hole in the spacer plate by means of simplified tooling and procedure.

Another object of the invention is to provide a procedure for forming the hole with an ovoid shape or its equivalent and which is readily adjustable or controlled to provide the degree of interference required.

In carrying out the present invention, the plates are formed with a round hole in the usual manner. This may include punching to form the hole followed by a shaving operation. The hole may also be balled to a give size less than the final hole size in order to improve the roundness of the hole. The balling operation as performed provides a ridge around the edge of the hole and projecting from the side of the plate from which the ball emerges. Both holes of each plate are preferably balled simultaneously and after heat-treatment, the plates are again balled to a larger size to set up residual stresses in the plate which increase the fatigue life of the chain. Thereafter the plate is pressed between two flat dies which engage the body of the plate and push only a given part of the ridge formed by the balling operations back into the hole. Only 180° or about one half of the length of the ridge is pushed back into the hole and specifically only that portion nearer the center of the plate or lying opposite the load area of the respective hole. The load bearing area of the plate refers to the force applied by the pin to the plate when the chain is under tension and is that part of the plate extending around the hole nearer the ends of the plate or remote from the center of the plate.

The drawings furnished herewith illustrate the best mode of carrying out the invention as presently contemplated and set forth hereinafter.

Figure 4:
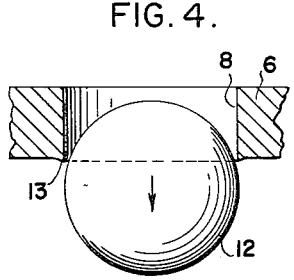
Figure 2:
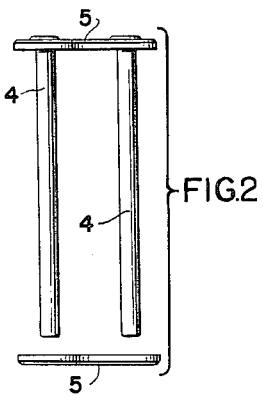
Figure 5:
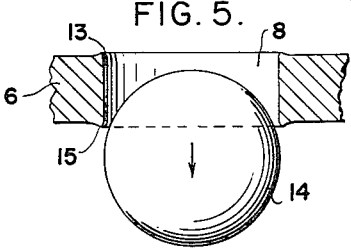
Figure 3:
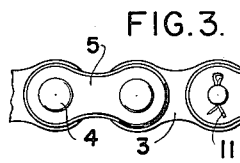
Figure 8:
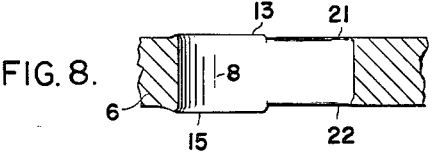
Figure 6:
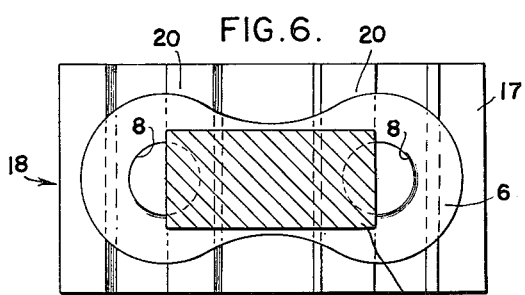
Figure 9:
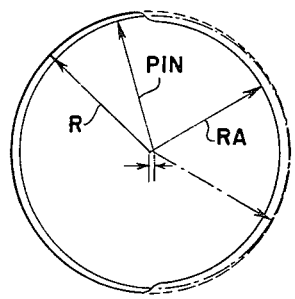
Figure 7:
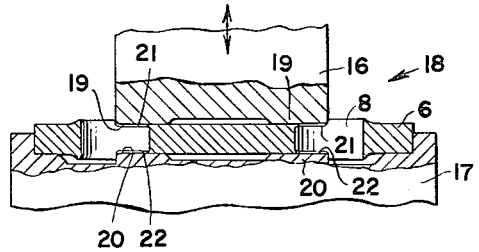
Figure 10:
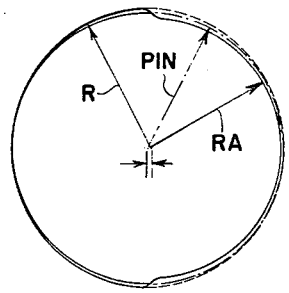

In the drawings:
FIGURE 1 is a plan view of a portion of a multiple strand roller chain incorporating the invention;
FIGURE 2 is a plan view of the preassembled pin link and of the cap plate completing the link;
FIGURE 3 is a side view of the roller chain shown in FIGURE 1;
FIGURE 4 is an enlarged cross-section taken through one end of the spacer or center plate prior to heat treatment, showing the ball emerging from one end of the hole and (not to scale) the ridge which is formed around one end of the hole at one side of the plate;
FIGURE 5 is a view similar to FIGURE 4 showing the plate after heat treatment and a slightly larger hardened steel ball which has been pushed through the hole of the plate in the opposite direction to form a similar ridge at the opposite end of the hole on the other side of the plate;
FIGURE 6 is a horizontal section of the punch as disposed above a plate resting on the lower face of the punch for reworking a part of both ridges around both holes;
FIGURE 7 is a side elevation of the punch with parts thereof broken away and in section and with the plate therebetween in section to show the formation of the hole;
FIGURE 8 is a cross-section of the plate as shown in FIGURE 5 after reworking by the punch as shown in FIGURES 6 and 7;
FIGURE 9 is an enlarged diagram showing the position of the pin in the hole of the "long" plate. R is the radius of the hole as formed, RA is the radius of the ridge projecting into the hole and the oppositely facing arrows indicate the adjustment allowed the pin in the hole; and
FIGURE 10 is an enlarged diagram similar to FIGURE 9 showing the position of the pin as it is held against the front side of the hole of the "short" plate.

The section of chain shown in FIGURES 1 and 2 of the drawing includes the rollers 1, the bushings 2 and bushing plates 3. Each plate 3 is formed with a pair of spaced holes and the ends of the bushings 2 are press-fit into the holes. Two bushings 2 secure each pair of the plates 2 in spaced relation and a roller 1 is rotatably disposed on each bushing 2 between said plates. Each pair of assembled bushings 2 and plates 3 comprise a bushing link. The chain shown in part is a multiple-strand chain and specifically a three-strand roller chain which, as such, includes three rows of such bushing links.

The adjacent bushing links in each row are joined by pin links comprising the pins 4, the cap plates 5 and spacer plates 6. The cap plates 5 are arranged in rows along each side of the chain and the spacer plates 6 are arranged in pairs between the rows of bushing links. The plates 5 and 6 of each pin link overlie the ends of the adjacent bushing plates 3 and are assembled on pins 4 extending through the corresponding bushings 2 and through the respective holes 7 and 8 of plates 5 and 6.

Each cap plate 5 is formed with the spaced holes 7 to receive the ends of the pins 4 with a tight fit and each plate 6 is similarly formed with the spaced holes 8 to receive and allow the pins to be passed therethrough.

In the assembly of the chain, the two pins of each link are usually first assembled with one cap plate 5 only as shown in FIGURE 2 and in a separate operation the plates 3 and bushings 2 are assembled to comprise the bushing links. The spacer plates 6 are then arranged between the bushing links and the free ends of the pins 4 of each assembly referred to are passed through the corresponding bushings 2 and are passed through the respective holes 8 of the plates 6. The second cap plate 5 is then assembled and fixed on the ends of the two pins of each assembly and projecting from the bushing links.

The ends of pins 4 may be formed or headed as shown to hold the cap plates 5 on the pins. For installation of the chain, the pins 4 of at least one pin link may be provided with small holes as at 10 to receive the cotter pins 11 allowing assembly and disassembly of the chain. Other removable means may be provided instead to secure the pins which are intended to be removable for such assembly and disassembly of the chain.

In the operation of the chain, the articulation of the pin links and bushing links is provided by the rotation of the pins 4 allowed by the clearances provided the pins in the bushings 2, both of which are hardened to resist wear. Rotation of the pins 4 in the cap plates 5 is not desired, however, because of wearing of the plates which are not as hardened. Generally excepting relatively large chain, such rotation is prevented by the tight fit of the pins 4 in the cap plates 5. The tight fit provided the pins in the plates also favorably stresses the plates to extend their fatigue life within limits.

However, the same tight fit of the pins in the holes of the plates 6 is not readily accomplished because of the variations which in normal manufacture occur or develop in the spacing or pitch of the respective holes of each plate. Because of such variations in pitch, the holes 8 of some of the plates, paired at random cannot correspond with each other and the pins in these holes are excessively tight while the pins in the holes of other of the plates paired at random may be excessively loose.

According to the present invention, the part of the ridge formed at the corner of the hole to project from the side of the plate and which is then pushed back into the hole to project axially and inwardly of the hole forms a compressible band which normally clamps the pin against the load bearing area of the plate.

The manufacture of the chain according to the present invention utilizes the slight lip or ridge formed around the hole by balling or drifting of the holes. The lip referred to as formed and for the purposes of the present invention is no more than a few thousandths of an inch in projection and as such does not alter the dimensions of the chain. The balling operation if performed before heat treatment of the plate, improves the roundness of the hole and as performed after heat treatment, the process serves to prestress the metal around the holes and improve the fatigue life of the plates. In practice, the lip formed by balling prior to heat treatment may be insignificant and this step may be dispensed with unless sizing of the hole is required.

For that purpose, the hole 8 of plate 6 should be formed slightly smaller than the desired size so that the slightly larger ball 12 as shown in FIG. 4 forms the annular lip 13 projecting from the end of the hole at the side of the plate from which the ball emerges. After heat treatment of plate 6, the ball 14 is passed through hole 8 in the opposite direction to form the lip 15 extending around the edge of the hole at the opposite side of the plate opposite the lip 13.

The plate is then placed between the upper and lower dies 16 and 17 of the punch 18. The working faces 19 and 20 of upper and lower dies 16 and 17 respectively, are flat and engage generally the opposite areas of the plate adjacent to the lip of each hole nearer the center of the plate and overlie the holes 8 of the plate 6 at least sufficiently to push those parts of lips 13 and 15 back into the hole.

The punch 18 may be operated by hydraulic or mechanical means. In the operation of the punch, the thickness of the plate itself determines the stroke of upper die 16 so that a simple impact-type air-operated hammer may be used for the operation. The punching operation pushes lips 13 and 15 back into the hole to form semi-circular compressible ridges 21 and 22 located at the ends of the hole at opposite sides of the plate and extending around the back side of the hole having reference to the load bearing area of the plate.

The size of holes 8 as finally formed with the radius R should have a diameter equal to or slightly greater than the diameter of the pins 4 to be inserted in the holes and so that ridges 21 and 22, or at least the ridges 22 having the radius RA, are plastically deformed upon assembly of the chain as described. Upon assembly, the pin fits tightly between the load-bearing area of the plate and the ridges and compresses the ridges generally their entire length of 180° around the back-side of the pin, referring to the side of the pin disposed nearer the center of the plate and opposite the load-bearing area of the plate. The compression of the ridge effects the principal securement of the pin and normally holds the pin tightly against the load bearing area referred to so that movement of the pin the hole is effectively prevented in chain service.

Such securement is also provided when the pins are assembled in a pair of plates having the same pitch so that the holes are in alignment.

Where variations in the pitch of paired plates occur as described, the compressibility of the ridges accommodates the misalignment of the holes so that the pin may be held tight only between the ridges along the back-side of the hole of the "long" plate as shown in FIG. 9, and the load-bearing area or the front side of the "short" plate as shown in FIG. 10. The ridges of the "long" plate in such cases may thus be fully compressed while the ridges of the "short" plate are compressed to a relatively small extent.

The compressibility of ridges 21 and 22 provides an elastic grip of the pin in the holes of each pair of plates substantially irrespective of their match or differences in pitch. Accordingly, the holes may be sized to provide a sufficiently tight fit of all pins to prevent their fretting and at the same time assuring that the pins may be assembled and removed with reasonable effort.

The size of the lips 13 and 15 as formed by the balls passed through the holes is limited and provides automatically a degree of control over the size of the ridges formed. The securement of the pins may be readily increased somewhat by pushing more of the lips back into the hole to engage up to 200° of the pin and may be readily reduced by forming ridges extending through arcs of a circle less than the 180° arcs shown and described.

Various modes of carrying out the invention are contemplated as being within the scope of the following claims particularly pointing out and distinctly claiming the subject matter which is regarded as the invention.

I claim:
1. The method of chain construction providing hardened fatigue-resistant areas defining spaced round holes of a pin plate and relatively elastic ridges at one side of the plate to bias or hold respective round pins toward or against the load bearing areas of the holes nearer the respective ends of the plate, which method comprises forming the holes to a given size less than that of the pin, heat treating the plate and thereafter enlarging the holes to a size at least equal to that of the pins by forcing a hardened ball or drift of a greater size than said given hole size through the holes and forming lips projecting from one side of the plate and extending around the end of each hole from which the ball or drift emerges, compressing the plate between flat dies and thereby forcing back into each hole that part of each lip which is nearer the center of the plate and opposite the load-bearing area of the respective hole to form an elastic ridge projecting into the hole, and pushing the pins into the holes and partially thereby pushing out said ridges which thereby serve to hold the pins against the respective load-bearing areas.

2. The method of chain construction providing a controlled interference fit of a round pin in a round hole of a metal pin plate having improved fatigue resistance characteristics, which method comprises forming the hole to a given size less than that of the pin and heat treating the plate, thereafter enlarging the hole to a size at least equal to that of the pin by forcing a hardened ball or drift of a greater size than said given hole size through the hole and forming a lip projecting from one side of the plate and extending around the end of the hole from which the ball or drift emerges, such enlarging also serving to cold work the metal forming the hole and eliminate minute cracks which tend to develop into fractures, compressing part of the plate between flat dies and thereby forcing back into the hole that part of the lip extending only around one side of the hole to form a ridge projecting into the hole to engage the pin with said given interference fit, and thereafter inserting the pin in the hole of the plate.

3. The method of claim 2 wherein the interference fit is controlled by adjusting the oversize of the ball or drift relative to said given hole size, the projection of the lip automatically determining the projection of the ridge and the degree of the interference fit.

4. The method of claim 2 wherein the parts of the lip which are forced back into the hole are selected to effect the desired interference fit and securement of the pin in the hole.

5. The method of chain construction providing a controlled interference fit of a round pin in a round hole of a metal pin plate, which method comprises forming the hole to a given size less than that of the pin, thereafter enlarging the hole to a size at least equal to that of the pin by forcing a hardened ball or drift of a greater size than said given hole size through the hole in one direction and forming a lip projecting from one side of the plate and extending around the end of the hole from which the ball or drift emerges, heat treating the plate, thereafter cold marking the hole by forcing a hardened ball or drift through the hole in the opposite direction and forming a lip projecting from the other side of the plate and extending around the other end of the hole, compressing part of the plate between flat dies and thereby forcing back into the hole that part of the lips extending only around one side of the hole to form ridges projecting into the hole to engage the pin with said given interference fit, and thereafter inserting the pin in the hole of the plate.

References Cited in the file of this patent

UNITED STATES PATENTS

| | | |
|---|---|---|
| 664,481 | Jacobs | Dec. 25, 1900 |
| 1,722,861 | Renshaw | July 30, 1929 |
| 2,187,661 | Lochrane | Jan. 17, 1940 |
| 2,424,087 | Focke | July 15, 1947 |
| 2,517,497 | Lauenstein | Aug. 1, 1950 |
| 2,690,678 | Bendall | Oct. 5, 1954 |
| 2,869,379 | Welser | Jan. 20, 1959 |

FOREIGN PATENTS

| | | |
|---|---|---|
| 541,426 | France | May 2, 1922 |
| 120,556 | Switzerland | June 16, 1927 |

OTHER REFERENCES

Watch & Clockmaker's Manual, by F. W. Britten, published 1930 by The Norman W. Hanley Publishing Co., 2 W. 45th St., New York, New York, pages 229-230.